(12) United States Patent
Towner

(10) Patent No.: US 7,271,822 B2
(45) Date of Patent: Sep. 18, 2007

(54) SEAMLESS STITCHING OF MULTIPLE IMAGE FIELDS IN A WIDE-FORMAT LASER PRINTER

(75) Inventor: David Kenney Towner, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 244 days.

(21) Appl. No.: 10/978,014

(22) Filed: Oct. 28, 2004

(65) Prior Publication Data

US 2006/0023059 A1 Feb. 2, 2006

Related U.S. Application Data

(60) Provisional application No. 60/591,683, filed on Jul. 28, 2004.

(51) Int. Cl.
*B41J 2/435* (2006.01)
(52) U.S. Cl. .................................. 347/234; 347/248
(58) Field of Classification Search ........ 347/116–117, 347/231, 233–235, 241–243, 248–250, 255–261; 359/201, 204; 355/41
See application file for complete search history.

(56) References Cited

U.S. PATENT DOCUMENTS

| 5,107,280 | A | * | 4/1992 | Ohashi et al. ............... 347/235 |
|---|---|---|---|---|
| 5,373,347 | A | | 12/1994 | Shaklee et al. |
| 5,903,378 | A | * | 5/1999 | Takano et al. ............... 359/201 |
| 6,023,557 | A | | 2/2000 | Shaklee |
| 6,097,418 | A | * | 8/2000 | Larsen et al. ............... 347/235 |
| 6,160,610 | A | * | 12/2000 | Toda ........................... 355/41 |
| 6,281,922 | B1 | * | 8/2001 | Suzuki ....................... 347/235 |
| 6,288,817 | B2 | * | 9/2001 | Rowe .......................... 359/204 |
| 6,288,818 | B1 | * | 9/2001 | Yoshimaru .................. 359/204 |
| 6,765,605 | B1 | * | 7/2004 | Inoue .......................... 347/234 |
| 2004/0085587 | A1 | | 5/2004 | Broddin et al. |

FOREIGN PATENT DOCUMENTS

| EP | 0946042 | | 9/1999 |
|---|---|---|---|
| JP | 58127912 A | * | 7/1983 |
| JP | 2000-187171 | | 7/2000 |
| JP | 2000-267027 | | 9/2000 |

* cited by examiner

*Primary Examiner*—Hai Pham

(57) ABSTRACT

Systems and methods are described for stitching multiple images together in a printer to form a single, seamless, composite image. The use of multiple laser sources and multiple scan lenses with one or more scanner assemblies and various image stitching methods achieves seamless image stitching in a manner that provides benefits over prior printers using single laser sources and single scan lenses. Such benefits include, for example, a wider image format, smaller optical spot size, reduced cost, and reduced overall size for the printer.

50 Claims, 10 Drawing Sheets

SEAMLESS STITCHING OF MULTIPLE IMAGE FIELDS IN A WIDE-FORMAT LASER PRINTER

CROSS REFERENCE TO RELATED APPLICATION(S)

This application claims priority of U.S. Provisional Application 60/591,683, SEAMLESS STITCHING OF MULTIPLE IMAGE FIELDS IN A WIDE FORMAT LASER PRINTER, filed Jul. 28, 2004.

TECHNICAL FIELD

The present disclosure generally relates to imaging devices, and more particularly, to a wide-format printer in which an image is formed by stitching together partial images from multiple image fields produced by one or more laser scanner assemblies.

BACKGROUND

Conventional wide-format laser printers have generally been limited to printing on A3 (297×420 mm) size media in portrait mode with a scan line length not exceeding about 317 millimeters. Therefore, the size of images printed with conventional wide-format laser printers is typically about the size of a ledger-sized sheet of paper, or about 11×17 inches. Commercial printing businesses would benefit significantly from a wide-format laser printer that could print larger images onto larger media. For example, a printer with a scan length of 614 mm could print an image 594 mm wide on C2 or B2 size media. Such an image would be twice as wide as the usual 297 mm wide A3 image. (Note that, in this example, the scan length exceeds the nominal image width by 10 mm at each end of the scan to allow for image position correction, crop mark printing, etc.) One way to increase the image width in a wide-format laser printer is to design a "scaled-up" version of a current laser scanner system such that the scaled-up scanner is capable of scanning a wider image field (e.g., 614 millimeters) in one scan pass. However, preliminary analysis of such scaled-up laser scanner designs demonstrates various problems. One such problem with scaling up an existing scanner design to a larger format is that the residual aberrations in the optical design scale in proportion to the scan length, thereby increasing the geometric focused spot size, while the diffraction-limited spot size remains constant. Consequently, a scanner design which is initially diffraction limited (i.e., which has a focused spot size very close to the theoretical minimum), will not ordinarily remain diffraction limited when doubled in size. Instead, the spot size will increase because the optical performance is now dominated by aberrations rather than diffraction. The result of scaling a just-diffraction-limited scanner by 2×, for example, would be a doubling of both the scan line length and the geometric focused spot diameter. Such a scaling operation does not achieve any increase in the total number of resolvable focused spots in a scan line, and the resulting scanner could not print any more optically resolved pixels in a scan line than the initial system. Achieving a 2× increase in the number of resolvable pixels requires reducing the geometric spot size in the 2× system below the diffraction limit, which requires a new optical design if it can be accomplished at all.

Another problem with simply scaling up an existing scanner design to a larger format is an associated disproportionate increase in cost to produce the scaled-up design. This is true even if we ignore the need to make the scaled-up system optically superior to the original (i.e., parent) scanner in order to control optical aberrations to a level that will enable the scaled-up system to be substantially diffraction limited. As an example of the disproportionate increase in costs, scaling up the linear dimensions of an existing (1×) scanner design by a factor of two increases the production costs for the scaled-up (2×) version by roughly a factor of 8 over the production costs of the original 1× design. This large cost increase is explained by the fact that the volume of any object scales as the cube of its linear dimension. Thus, every part of the 2× scanner has eight times the volume of the corresponding part in the 1× scanner. Like many products, the manufacturing cost for a laser scanner assembly is very roughly proportional to its volume or, equivalently, its weight.

Accordingly, the need exists for a way to increase the printable image width in a wide-format laser printer that avoids the optical problems and added expense associated with scaling up existing optical designs to wider formats.

SUMMARY

Systems and methods are described for forming an image on a photosensitive element from separate image fields joined together at a seamless stitch.

BRIEF DESCRIPTION OF THE DRAWINGS

The same reference numbers are used throughout the drawings to reference like components and features.

DETAILED DESCRIPTION

Overview

The following discussion is directed to systems and methods for stitching multiple images together in a wide-format printer to form a single, seamless, composite image. The human visual system is highly sensitive to linear features and can readily perceive errors as small as 10 µm in the placement of rows or columns of pixels on a page. Splicing pixelated image fields at their common boundaries without creating noticeable seams between the image fields or other visible artifacts is complicated by the difficulty of locating corresponding pixels in two separate image fields with sufficient accuracy to render a simple splice invisible. However, the use of multiple scanner assemblies and various image stitching methods as described herein reduces the visibility of image splices in the presence of such pixel placement errors and achieves seamless image stitching in a manner that provides benefits over prior wide-format printers using single laser scanner assemblies. Such benefits include, for example, a smaller optical spot size, reduced cost, reduced overall size for the printer, increased page rate, and in some cases, the ability to design and manufacture a laser scanner having a format width which exceeds the current state of the art for conventional laser scanner designs.

Exemplary System Environment

Figure 1:
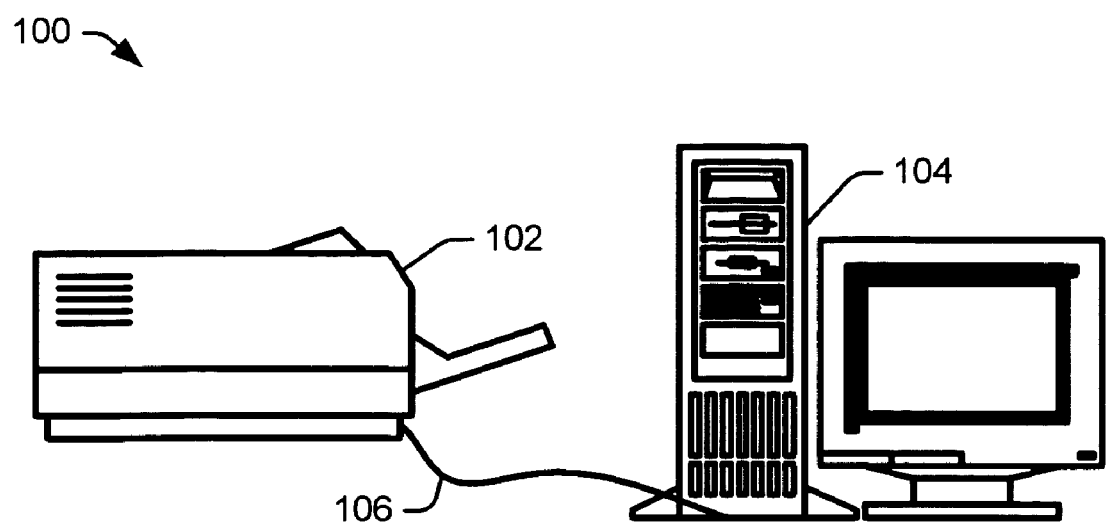
FIG. 1 illustrates an exemplary environment for a wide-format imaging device capable of seamless image stitching.

FIG. 1 illustrates an exemplary environment for implementing one or more embodiments of an imaging device that provides seamless image stitching of multiple image fields. The exemplary environment 100 of FIG. 1 includes a wide-format imaging device 102 operatively coupled to a host computer 104 through a network 106. The network 106 can be a direct or indirect link and may include, for example, a printer cable, a LAN (local area networks), a WAN (wide area networks), an intranet, the Internet, or any other suitable communication link. Network 106 can also include a wireless communications link such as an IR (infrared) or RF (radio frequency) link.

This disclosure is applicable to various types of imaging devices 102 that may be generally configurable to operate using, for example, a wide format, and that use a beam of light to record an image onto a photoconductive or otherwise photosensitive surface, such as devices capable of implementing an electrophotographic (EP) imaging/printing process or photographic imaging process for rendering PDL (page description language) data in printed form on a print medium. Therefore, imaging device 102 can include devices such as laser-based printers, photocopiers, scanners, fax machines, multifunction peripheral devices and other EP-capable devices, as well as photographic printers.

Host computer 104 can be implemented as a variety of general purpose computing devices including, for example, a personal computer (PC), a server, a Web server, and other devices configured to communicate with imaging device 102. Host computer 104 typically provides a user with the ability to manipulate or otherwise prepare in electronic form, an image or document to be rendered as an image that is printed or otherwise formed onto a print medium by imaging device 102 after transmission over network 106. In general, host computer 104 outputs host data to imaging device 102 in a driver format suitable for the device 102, such as PCL or PostScript. Imaging device 102 converts the host data and outputs it in a wide format onto an appropriate recording medium, such as paper, transparency or photographic film.

Exemplary Embodiments

Figure 2:
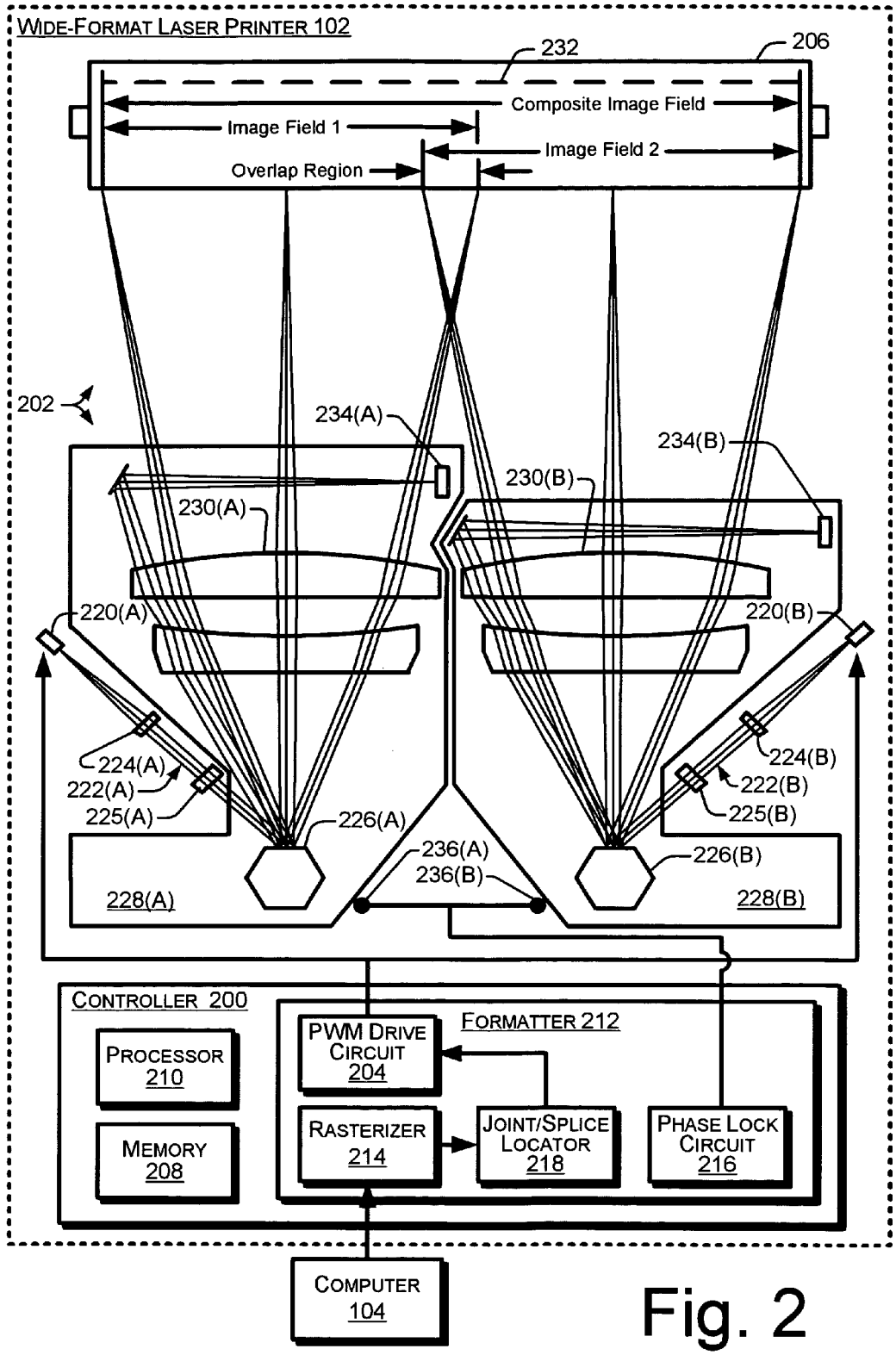
FIG. 2 is a functional and block diagram representation of one embodiment of a wide-format imaging device implemented as a laser printer and configured to perform seamless image stitching.

FIG. 2 is a block diagram representation of an imaging device embodied as a wide-format laser printer 102. The block diagram representation of wide-format laser printer 102 includes an embodiment of a controller 200 and an embodiment of an image forming system 202. Computer 104 provides data, including print data, to controller 200. Laser printer 102 is generally disposed to modulating the operating frequencies of a pulse width modulator (PWM) drive circuit 204 to place pixels onto the surface of a photosensitive element 206 for holding an image to be printed onto a print medium. Although FIG. 2 illustrates photosensitive element 206 in the form of a photoconductive drum 206, it is understood that other forms of photosensitive elements 206 are possible. For example, photosensitive element 206 can optionally be configured as a continuous, photoconductive belt or other photoconductive image transfer medium, or as photographic film or paper in a direct exposure process.

Controller 200 is typically a printed circuit assembly that includes a memory 208 such as Random Access Memory (RAM) and/or non-volatile memory for holding an image to be printed, executable instructions, and other data for controller 200. Controller 200 also includes a microprocessor 210 to process images, instructions and other data, in addition to other general data formatting circuitry such as that illustrated in data formatter 212. Data formatter 212 is typically embodied as an ASIC (application specific integrated circuit) having various blocks of hardware implemented as logic gates. Thus, data formatter 212 includes a rasterizer block 214, a phase lock circuit block 216, a joint/splice locator block 218, and PWM (pulse width modulation) drive circuit block 204. Rasterizer block 214 and joint/splice locator block 218 might also be implemented as firmware instructions stored in a memory 208 and executable on processor 210.

In general, rasterizer 214 converts print data from computer 104 into pixel/video data that PWM drive circuit 204 uses to form an image on photosensitive element 206. More specifically, PWM drive circuit 204 uses pixel data from rasterizer 214 to control the flow of drive current to light sources, such as laser sources 220, in image forming system 202. In response to the drive current, laser sources 220 generate pulsating laser beams 222 to form images on photosensitive element 206. The time period of the pulses of the laser beams 222 corresponds to the time period of the pulses of the pixel/video data. Laser sources 220 may be multi-element laser diode arrays, each capable of emitting multiple independently-modulated beams for simultaneously writing multiple scan lines, as is well known in the art.

As discussed in greater detail below, the described embodiment of FIG. 2 includes a joint/splice locator 218 that formats data from rasterizer 214 into two or more separate video data streams for the PWM drive circuit 204. The PWM drive circuit 204 uses the video data streams to modulate two or more separate laser beams (represented in FIG. 2 by beams 222(A) and 222(B) from laser sources 220(A) and 220(B), respectively) that, in turn, create two separate, adjacent, and overlapping image fields (i.e., Image Field 1 and Image Field 2 of FIG. 2) on photosensitive element 206 that are joined together by a seamless joint or splice.

In the described embodiment of FIG. 2, image forming system 202 focuses each beam emitted by laser sources 220 into a corresponding focused spot on the surface of photosensitive element 206. Image forming system 202 further controls the movement of pulsating laser beams 222 from laser sources 220 across the surface of photosensitive element 206 by deflecting the beams 222 by reflection from rotating polygon scanners 226 after passing the beams 222 through respective collimating lenses 224 and cylinder lenses 225 that establish the desired wavefront curvature for the beams 222, as is well known in the art. After reflection from polygon scanners 226 within respective scanner assemblies 228, the laser beams 222 pass through respective scan lenses 230 and are incident upon photosensitive element 206 along one or more scan lines 232. For purposes of illustration, FIG. 2 shows laser beams 222(A) and 222(B) in three scan positions corresponding to three positions of polygon scanners 226(A) and 226(B).

As a pulsating beam 222 is scanned across photosensitive element 206, it exposes regions or spots along a scan line 232 on the surface of photosensitive element 206 that have a dimension in the direction of the scan. The exposed regions or image spots represent pixel data (i.e., raster image data), and their dimensions along a scan line 232 are determined by the time periods of the pulses of the video data that drives PWM drive circuit 204. In a typical electro-photographic process in which photosensitive element 206 is a photoconductor, exposed regions have a different electrostatic charge than unexposed regions. The electrostatic charge differential forms a latent image on photoconductor 206 that permits development of ink or toner to the photoconductor 206 in a pattern corresponding to the latent image. A transfer roller or belt (not shown) may be used to facilitate the transfer of ink or toner from the photoconductor onto a print medium in the form of a visible image.

Position sensors 236 in scanner assemblies 228 provide position feedback to a phase lock circuit 216 on controller 200 that controls the relative positions of scanner 226(A) and 226(B). The phase lock circuit 216 compares the relative positions of scanners 226(A) and 226(B) and attempts to drive any differences or errors in relative position to zero by accelerating or decelerating one of the scanner motors (not shown) in scanner assemblies 228. Alternatively, start of scan detectors 234 (described below) can be used to provide position feedback to the phase lock circuit 216. The use of such position sensors 236 or 234 and phase lock circuits 216 is generally well-known to those skilled in the art. Synchronizing the polygon scanners 226(A) and 226(B) in this manner ensures a more accurate and repeatable placement of image spots within each of the image fields (i.e., Image Field 1 and Image Field 2 of FIG. 2). More specifically, synchronizing the scanners 226 promotes cross-scan (process direction) accuracy by limiting the magnitude of cross-scan direction placement errors between Image Field 1 and Image Field 2.

Image forming system 202 also includes start of scan detectors 234(A) and 234(B) for determining the start of scan time for laser beams 222(A) and 222(B), respectively. A start of scan detector 234 detects the position of laser beam 222 in the scan direction as the beam approaches the portion of the photosensitive element 206 where the video data stream should be turned on. The start of scan detector 234 provides the laser beam 222 position information to the controller 200 in order to trigger the video data stream at the correct moment, thereby properly aligning each scan line in the scan direction at the edge of the scanned format As mentioned above, the FIG. 2 embodiment includes a joint/splice locator 218 that formats data from rasterizer 214 into two separate video data streams. Each video data stream is formatted to generate one portion (e.g., one half) of an image (i.e., Image Field 1 and Image Field 2 of FIG. 2) to be formed adjacent to one another on photosensitive element 206 by the two laser sources 220 and scanner assemblies 228. Image Field 1 and Image Field 2 of FIG. 2 are separate but overlapping in an overlap region that is an area of photosensitive element 206 on which both laser/scanner assemblies can write image information. It is within the overlap region (FIG. 2) on photosensitive element 206 that image fields are joined together by a seamless joint or splice.

It is noted, that while the presently described embodiment of the wide-format imaging device 102 illustrated in FIG. 2 indicates an optical system having two laser sources, two collimators, two cylinder lenses and two scanner assemblies each having a two-element scan lens, this embodiment is not intended to limit the configuration of such an optical system. Thus, this disclosure contemplates an optical system having additional laser/scanner/lens assemblies, each driven by a separate video data stream to form a different image field on photosensitive element 206 as formatted by joint/splice locator 218.

The joint/splice locator 218 is configured to format image data from rasterizer 214 using several different stitching methods in addition to generating two video data streams to drive PWM drive circuit 204. Each image stitching method increases the accuracy of the intersection between Image Field 1 and Image Field 2 on photoconductor 206 and decreases the possibility of visible seams or other artifacts in the composite image when the image fields are written to the photosensitive element 206. FIGS. 3-6 illustrate examples of how Image Fields 1 and 2 may be written to photoconductor 206 based on the image stitching methods used by joint/splice locator 218.

Figure 3A:
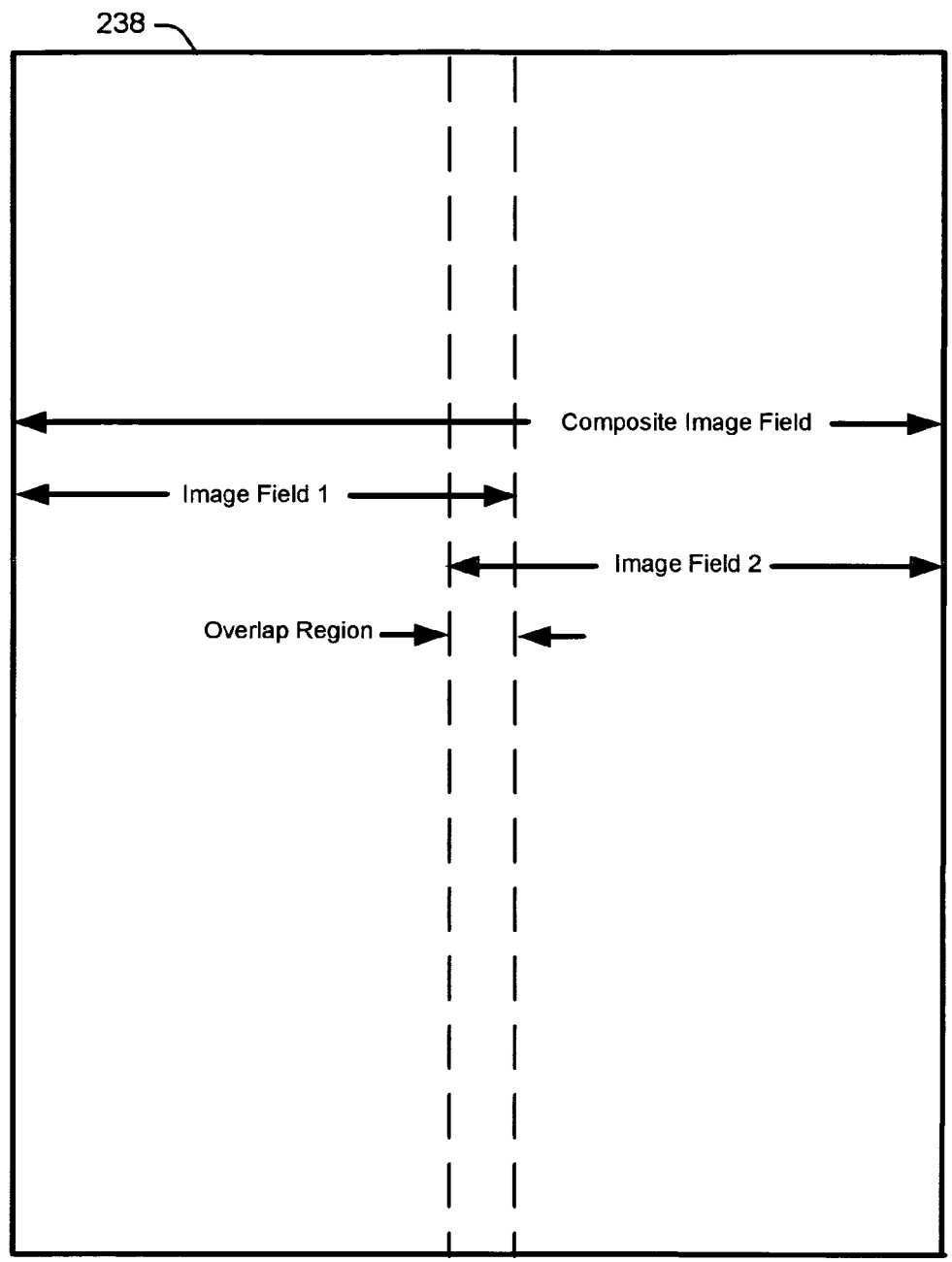
FIG. 3a illustrates exemplary image fields reproduced on a print medium.

FIG. 3a illustrates an example of a printer output medium 238 identifying the printed areas corresponding to two image fields (e.g., Image Field 1 and Image Field 2 of FIG. 2). Note that image field locations are generally reversed in printers which use a single-stage transfer process.

Figure 3B:
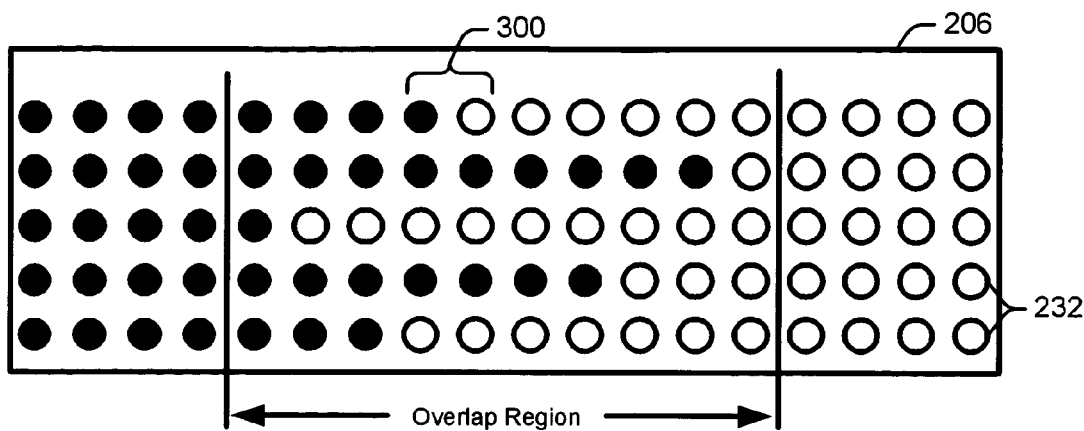
FIG. 3b illustrates exemplary image fields joined on a photosensitive element by a joint randomization image stitching method.

FIG. 3b illustrates an example of two image fields (e.g., Image Field 1 and Image Field 2 of FIG. 2) written to photosensitive element 206 that are joined through a random location of joints 300 along successive scan lines 232 within an image overlap region. In FIG. 3b, pixels exposed in Image Field 1 are illustrated at a highly enlarged scale by black or filled circles while pixels exposed in Image Field 2 are illustrated by white or non-filled circles. It is apparent from the illustration of FIG. 3b that for each scan line 232, joint/splice locator 218 has randomly located the joint between Image Field 1 and Image Field 2 within the overlap region. The random location of the joints 300 breaks the linearity of the seam between Image Fields 1 and 2, thereby making the seam less noticeable to the human visual system. In a color printer that superimposes multiple color layers (also called color planes or color separations) in a single output print, joint/splice locator 218 would, in general, independently randomize the joint locations for each color layer, further reducing the visibility of the seam between Image Fields 1 and 2.

Figure 3C:
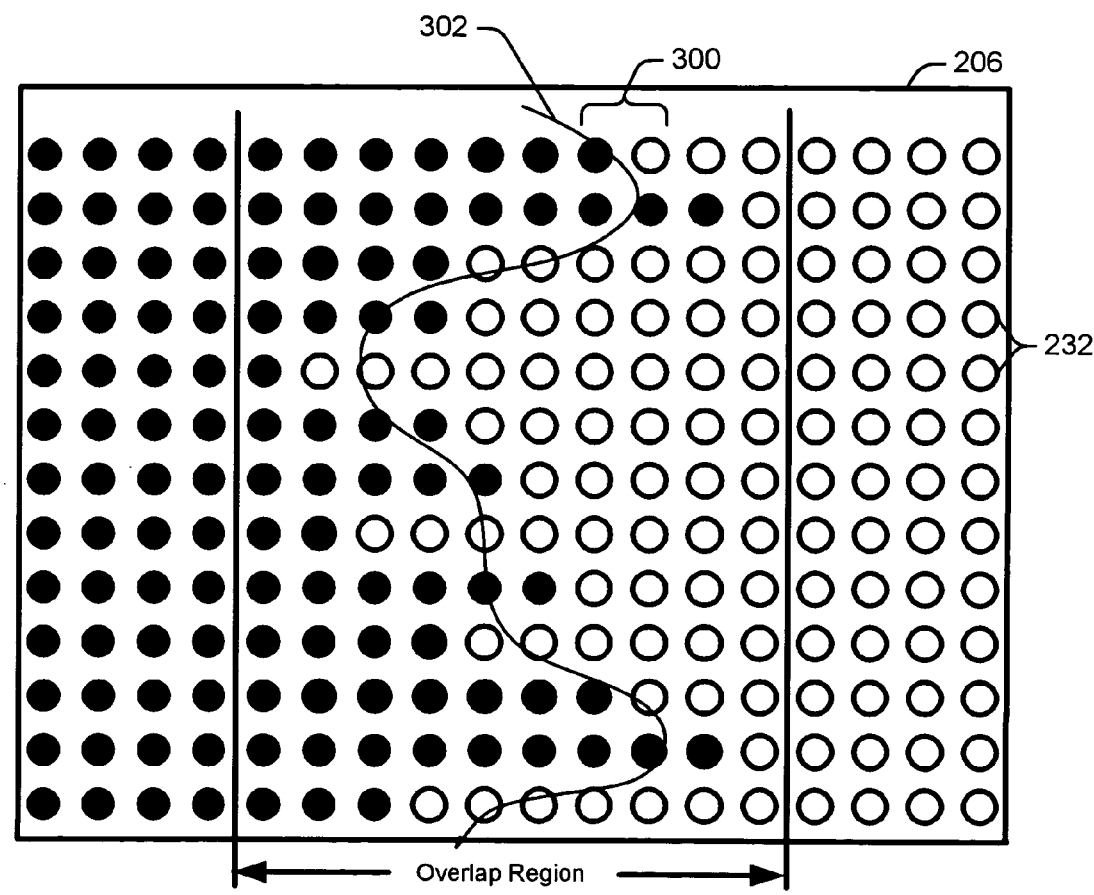
FIG. 3c illustrates exemplary image fields joined on a photosensitive element by a curvilinear joint randomization image stitching method.

FIG. 3c illustrates an example of two image fields (e.g., Image Field 1 and Image Field 2 of FIG. 2) written to photosensitive element 206 that are joined using a curvilinear joint randomization method that randomly locates joints 300 along successive scan lines 232 about a curvilinear seam midline 302 within an image overlap region. The curvilinear seam midline establishes a nominal joint location for each scan line 232. The actual joint locations are determined by a randomization algorithm that displaces each joint a randomly variable distance to either side of the curvilinear seam midline.

Figure 3D:
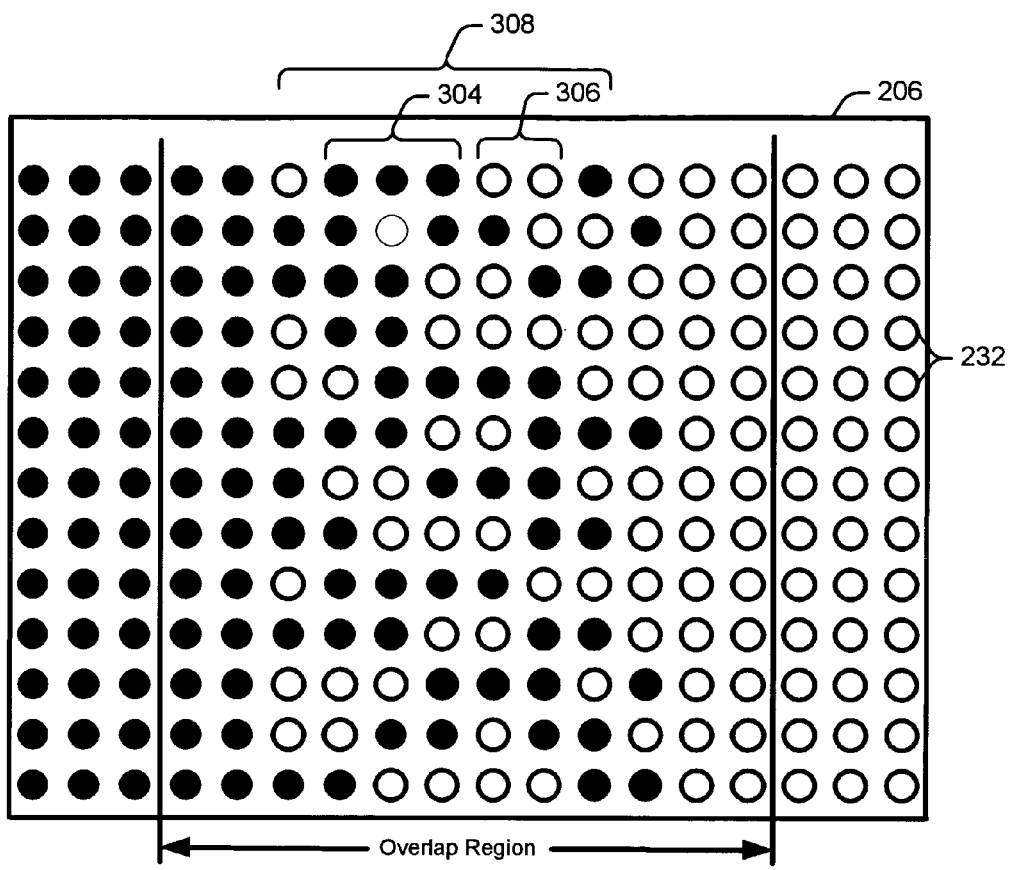
FIG. 3d illustrates exemplary image fields joined on a photosensitive element by an interleaved segment joint randomization image stitching method.

FIG. 3d illustrates an example of two image fields (e.g., Image Field 1 and Image Field 2 of FIG. 2) written to photosensitive element 206 that are joined using an interleaved segment joint randomization method. Segments 304 of a scan line 232 are exposed as a part of Image Field 1 while segments 306 of scan line 232 are exposed as a part of Image Field 2. Segments 304 and 306 are interleaved such that segments 304 and 306, taken from Image Fields 1 and 2 respectively, alternate with each other to form a splice or joint within an image overlap region. Alternating segments 304 and 306 may be of varying lengths and may be randomly positioned within a splice region 308 which is within the overlap region. The splice region 308 is shown by way of example only and is not intended to limit the number of pixels over which Image Field 1 and Image Field 2 may be joined. Thus, splice region 308 may occur over many more pixels within an overlap region than is indicated in FIG. 3d. Splice region 308 may be variably or randomly located within the overlap region and the position of segments 304 and 306 along a scan line 232 may be randomized independently for other scan lines in the same color layer and for the same scan line in other color layers.

Figure 4:
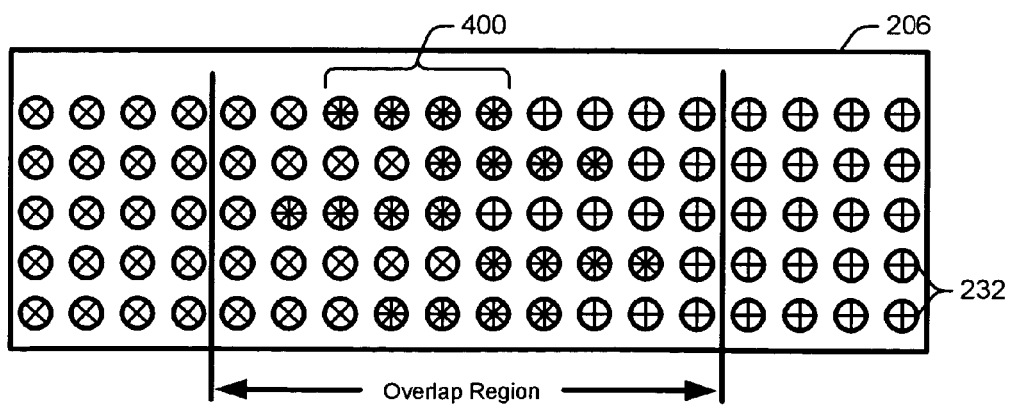
FIG. 4 illustrates additional exemplary image fields joined on a photosensitive element by a ramped exposure image stitching method.

FIG. 4 illustrates an example of two image fields (e.g., Image Field 1 and Image Field 2 of FIG. 2) written to photosensitive element 206 wherein successive scan lines 232 are joined within a splice region 400 which is within an image overlap region. In FIG. 4, Image Field 1 is illustrated by pixels having an "X" through their centers while Image Field 2 is illustrated by pixels having a cross "+" through their centers. The splice region 400 is shown by way of example only and is not intended to limit the number of pixels over which Image Field 1 and Image Field 2 may be joined. Thus, splice region 400 may occur over many more pixels within an overlap region than is indicated in FIG. 4. It is apparent from the illustration of FIG. 4 that for each scan line 232, joint/splice locator 218 has randomly located a splice region 400 over which one end of Image Field 1 intersects one end of Image Field 2. The splice regions 400 spatially distribute pixel placement errors between image fields over many pixels along each scan line 232, tending to reduce the visibility of scan line joints, which in turn makes the intersection between the image fields less noticeable. In addition, the random location of the splice regions 400 between successive scan lines breaks up the linearity of the seam between Image Fields 1 and 2, thereby making the seam less noticeable to the human visual system.

Figure 5:
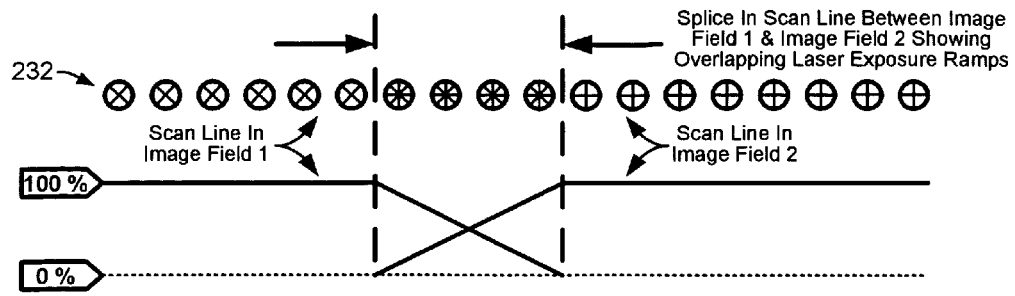
FIG. 5 illustrates laser exposure ramps in a scan line between two overlapping image fields spliced together.

FIG. 5 illustrates an extension of the randomly placed image splice regions 400 discussed above with respect to FIG. 4. FIG. 5 illustrates a single scan line 232 wherein Image Field 1 and Image Field 2 intersect in a spliced region 400 and wherein the exposure level from the respective laser sources 220 (FIG. 2) generating the image fields is adjusted within the spliced region 400 by the joint/splice locator 218. As laser beam 222(A) which is writing image spots in Image Field 1 enters the spliced region 400, the exposure level from respective laser source 220(A) is at 100%. As laser beam 222(A) progresses through the spliced region 400, the exposure level from laser source 220(A) is reduced (i.e., ramped down) to zero %. Conversely, as the corresponding scan line for Image Field 2 enters the spliced region 400, the exposure level from respective laser source 220(B) is at zero %. As laser beam 222(B) progresses through the spliced region 400, the exposure level from the respective laser source 220(B) is increased (i.e., ramped up) to 100%. Ramping the exposure level from laser sources 220 adjusts the exposure of the image fields along the scan lines 232, thereby decreasing the exposure of Image Field 1 as it comes to an end within the overlap region while increasing the exposure of Image Field 2 as it begins within the overlap region. Ramping the exposure of the image regions can be achieved by either changing the intensity (i.e., changing the power) of a laser element in a laser source 220 or by changing the pulse duration of the laser element 220.

Figure 6:
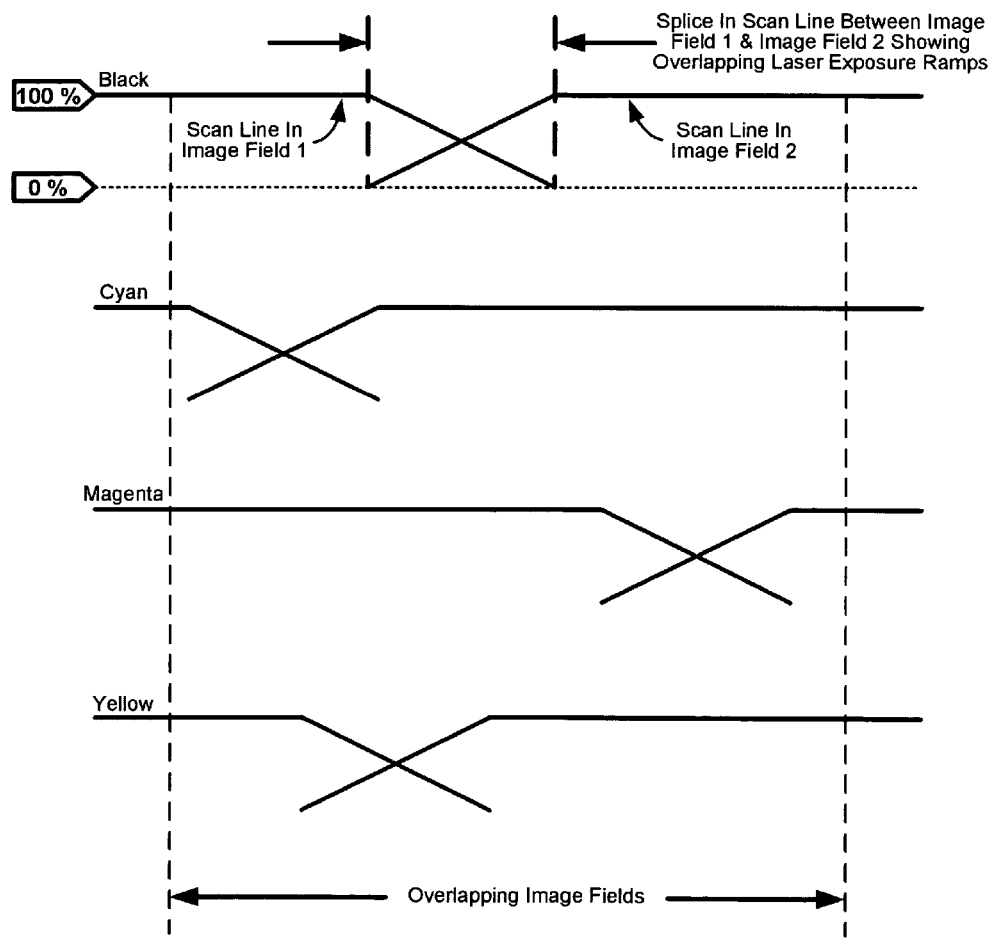
FIG. 6 illustrates four laser exposure ramps for corresponding scan lines in a color image where the different color layers are joined in a ramped exposure image stitching method which randomizes the splice locations among the color layers.

FIG. 6 illustrates an example of the exposure levels of two image fields (e.g., Image Field 1 and Image Field 2 of FIG. 2) written to photosensitive element 206 in a color printer that are joined within splice regions (e.g., such as regions 400) randomly located by the joint/splice locator 218 within the overlap region such that splice locations are independently randomized for each color layer. For each color layer the exposure levels within the splice regions are additionally ramped as discussed above with respect to FIG. 5. For each scan line in each color layer in an Image Field 1, the joint/splice locator 218 determines the location of a splice region within the overlap region where the same scan line in the same color layer in an Image Field 2 will be joined. For that scan line in that color layer, the exposure level from laser source 222(A) in Image Field 1 is ramped down within the splice region while exposure from laser source 222(B) in Image Field 2 is ramped up. The splice region for each of the color layers (e.g., Black, Cyan, Magenta, Yellow) is randomly located within the overlap region for each scan line. Therefore, splice locations for the same color layers are randomized among neighboring scan lines, while splice locations for corresponding scan lines in different color layers are also randomized with respect to one another.

Numerous combinations of the image stitching methods described with reference to FIGS. 3a, 3b, 3c, 3d, 4, 5 and 6 are possible, but will not be described or illustrated here. An example of such a combination is interleaved segment image stitching, illustrated in FIG. 3d, which is randomly located about a curvilinear seam midline such that the shape and position of the midline varies from one color layer to the next. In the context of this disclosure, the terms "randomly located", "randomly positioned", "randomized", and the like, refer to algorithms used by joint/splice locator 218 to generally randomize the visually perceived location of scan line joints or splices within an overlap area between image fields. Numerous such randomization algorithms are possible which have a variety of statistical properties. It may be desirable, for example, to use a randomization algorithm that produces a quasi-normal distribution of scan line joints about a predetermined central location, rather than a uniform distribution within the limits of the overlap region. It may also, for example, be desirable to avoid certain combinations of scan line splice locations that would occur in a truly random distribution but which are known to cause visible artifacts. Consequently, referring to splice/joint positions as "randomly located", or the like, is not intended to limit the choice of algorithms used by joint/splice locator 218.

Figure 7:
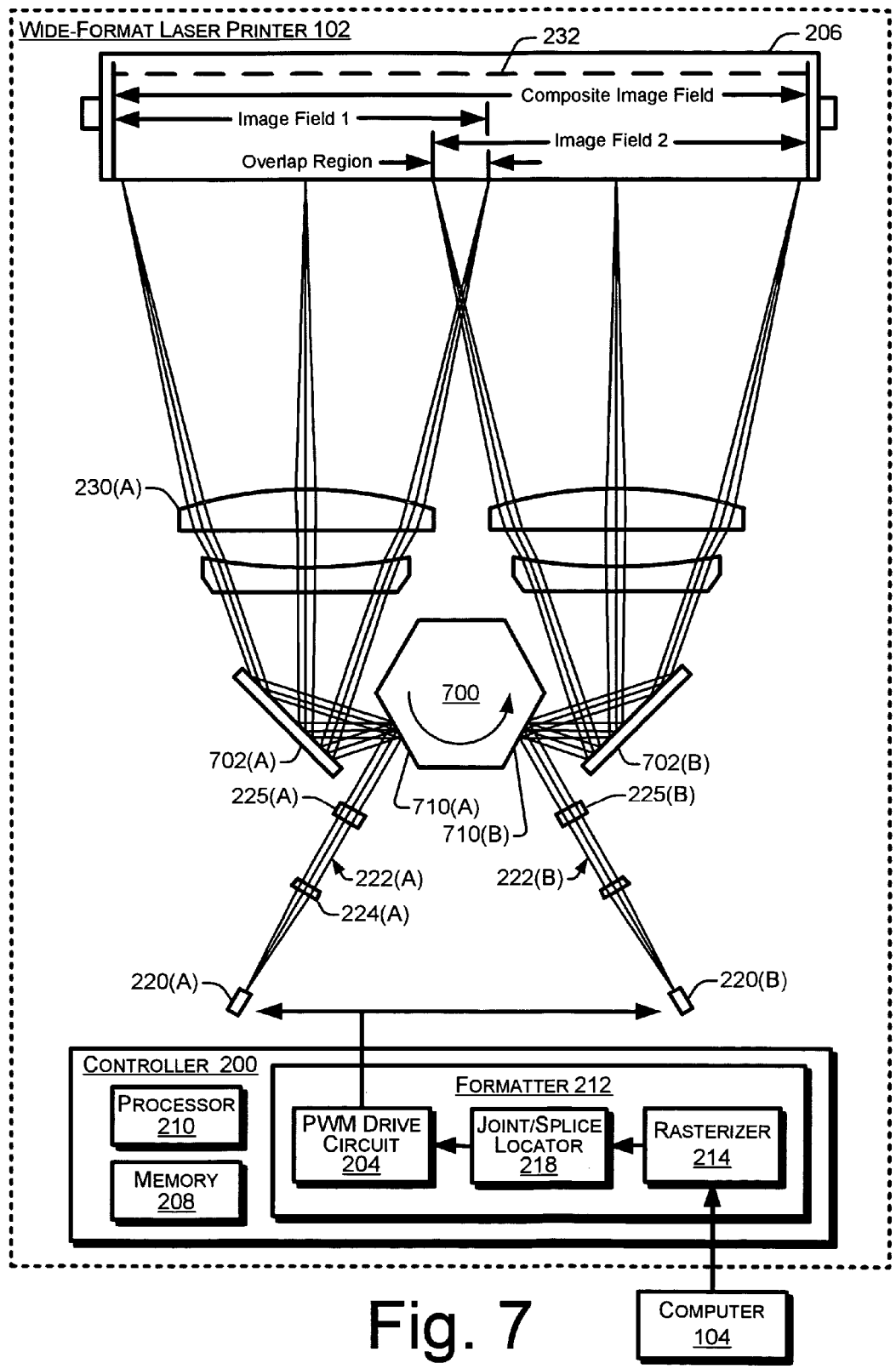
FIG. 7 is a functional and block diagram representation of a second embodiment of a wide-format imaging device implemented as a laser printer and configured to perform seamless image stitching.

FIG. 7 is a block diagram illustrating another embodiment of an imaging device implemented as a wide-format laser printer 102. The FIG. 7 embodiment contains many of the same elements as the FIG. 2 embodiment discussed above, however the FIG. 7 embodiment uses only one polygon scanner 700 and enables improved control over scan line placement. In addition, the current embodiment of FIG. 7 has two plane folding mirrors 702(A) and 702(B) to direct the two scanning laser beams 222(A) and 222(B) to separate image fields (i.e., Image Field 1 and Image Field 2) on photosensitive element 206. Alternatively, folding prisms could be used in place of folding mirrors 702(A) and 702(B). The joint/splice locator 218 functions in the same general manner as discussed above to format image data from rasterizer 214 using several different stitching methods while generating two or more video data streams that are processed by PWM drive circuit 204 and used to modulate two or more laser beams (represented in FIG. 7 by beams 222(A) and 222(B) from laser sources 220(A) and 220(B), respectively) that, in turn, create two separate, adjacent, and overlapping image fields (i.e., Image Field 1 and Image Field 2 of FIG. 7) on photosensitive element 206 that are joined together by a seamless joint or splice. Therefore, the image stitching solutions discussed above with reference to FIGS. 3-6 and the embodiment of FIG. 2 are equally applicable to the embodiment of FIG. 7.

The single polygon scanner 700 in the FIG. 7 embodiment provides the two overlapping image fields (i.e., Image Field 1 and Image Field 2) without the need to phase lock two separate polygons as in the prior embodiment of FIG. 2. Thus, there is no need for a phase lock circuit 216 (FIG. 2), and costs associated with a second polygon assembly and a phase lock circuit are eliminated. Likewise, uncorrected residual position errors that inevitably result from phase locking two separate polygon scanners are eliminated.

The single polygon scanner 700 enables an image stitching solution wherein any errors in facet tilt on the polygon scanner 700 introduced during fabrication affect both the Image Field 1 portion and the Image Field 2 portion of a stitched scan line similarly. This is accomplished by writing the Image Field 1 and Image Field 2 portions of each scan line with the same polygon facet. Using the example of FIG. 7, a selected polygon facet located at position 710(A) causes laser beam 222(A) to scan Image Field 1 thereby writing a first portion of a scan line 232. As polygon scanner 700 rotates in a counter-clockwise direction, the selected polygon facet moves two facet increments to position 710(B) where it causes laser beam 222(B) to scan Image Field 2 thereby writing a second portion of scan line 232. Unless otherwise corrected, the process motion of photosensitive element 206 will cause the first and second portions of scan line 232 to be displaced in the process-direction by a distance equal to the surface speed of photosensitive element 206 multiplied by the time interval between the end of scan for the first portion of scan line 232 and the start of scan for the second portion of scan line 232. In the current embodiment, this process-direction position error is eliminated by introducing a compensating process-direction alignment offset between Image Field 1 and Image Field 2. This is accomplished, for example, in an alignment step during the manufacture of printer 102 wherein the path of laser beam 222(B) along a second portion of scan line 232 in Image Field 2 is advanced in position relative to the path of laser beam 222(A) that exposes a first portion of the same scan line 232 in Image Field 1, the amount of position advance at the surface of photosensitive element 206 being equal to the required process-direction alignment offset. This process-direction alignment offset is readily introduced, for example, by shifting one or both of laser sources 220(A) and 220(B) in the process direction. In one solution, laser sources 220(A) and 220(B) are shifted equal and opposite amounts to introduce the desired process-direction alignment offset at the photosensitive element while minimizing the distance either laser source is moved relative to the axis of its respective optical system.

Where laser sources 220(A) and 220(B) are multi-element laser sources, the process-direction alignment offset required to compensate the process-direction position error will increase in proportion to the number of laser elements in each laser source. Thus, the process-direction alignment offset at the surface of photosensitive element 206, measured in increments of the scan line spacing, is equal to M×N, where "M" is the number of scanning beams emitted by each laser source and "N" is the number of polygon facet intervals separating input beams 222(A) and 222(B). This process-direction alignment offset enables a given polygon facet to first write a first portion of a scan line, (the portion in Image Field 1, for example), after which it writes a second portion of the same scan line (the portion in Image Field 2, for example) in process-direction registration but N facet intervals later in time. Thus, Image Field 1 and Image Field 2 for every scan line are written using the same polygon facet, and any cross-scan tilt error of that facet will have a substantially identical affect on the position of both image fields of the scan line, further reducing the visibility of the splice between the two image fields.

Exemplary Methods

Example methods for seamlessly stitching images in a wide-format imaging system such as those discussed above will now be described with primary reference to the flow diagrams of FIGS. 8-11. The methods apply generally to the exemplary embodiments discussed above with respect to FIGS. 2-7. The elements of the described methods may be performed by any appropriate means including, for example, by hardware logic blocks on an ASIC or by the execution of processor-readable instructions defined on a processor-readable media, such as a disk, a ROM or other such memory device.

Figure 8:
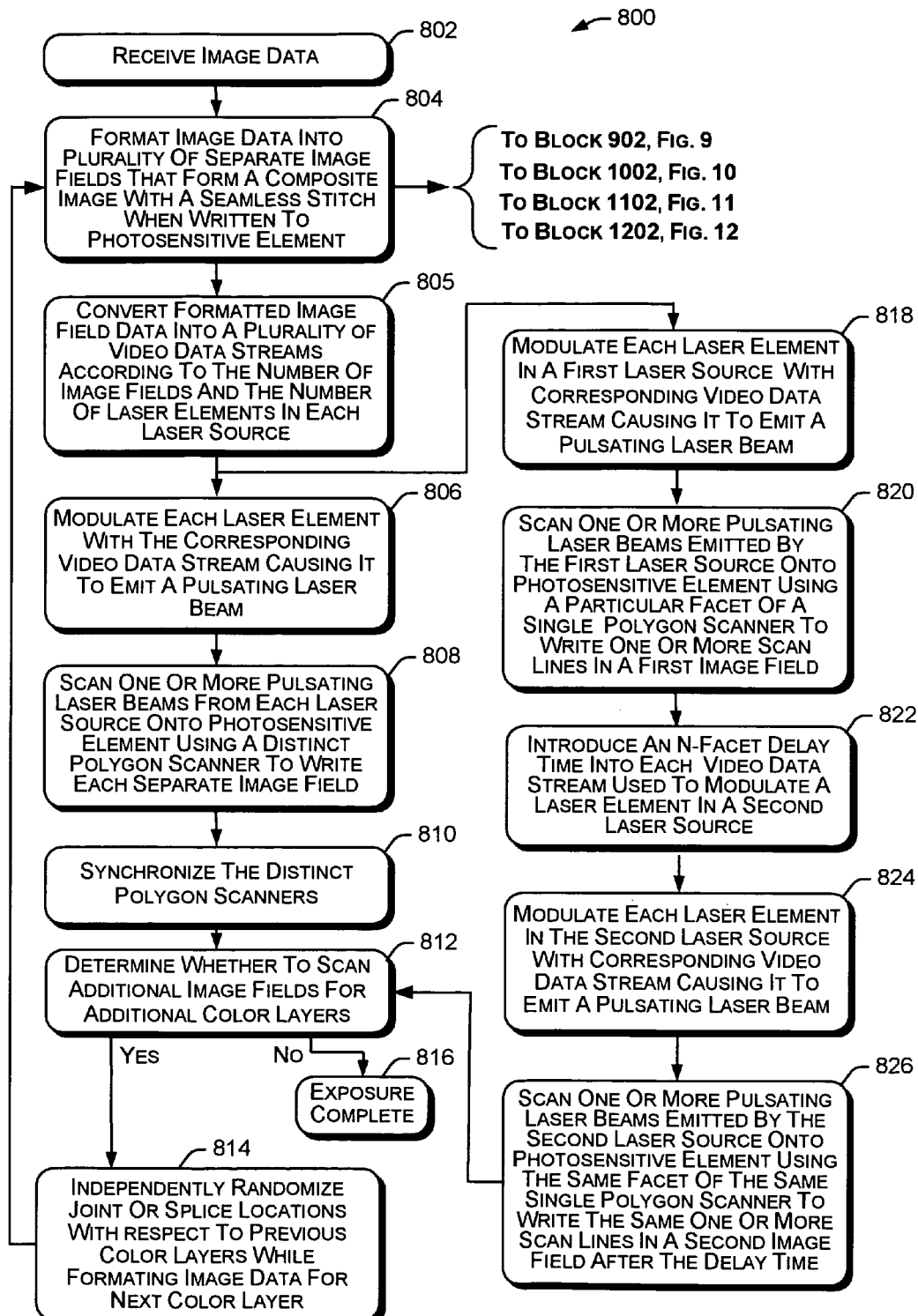
FIGS. 8-12 are flow diagrams illustrating example image stitching methods for stitching images together in a wide-format imaging system.

FIG. 8 shows an exemplary method 800 for stitching images in a wide-format imaging system. At block 802, image data is received at a wide-format imaging system such as laser printer 102. The data is typically received from a host computer. At block 804, the image data is formatted into a plurality of separate image fields that will form a composite image with a seamless stitch when written to a photosensitive element. As discussed below, several image stitching methods continue from block 804.

Continuing method 800 at block 805, formatted image data is converted into a plurality of video data streams according to the number of image fields and the number of laser elements in each laser source. For example, a printer 102 having two image fields each exposed by a four-element laser source will have a total of eight laser elements and will require eight video data streams, one for each laser element. At block 806, each laser element is modulated by the corresponding video data stream causing it to emit a pulsating laser beam. Laser sources that comprise multiple laser elements emit multiple independent pulsating beams. At block 808, one or more pulsating beams from each laser source are scanned onto a photosensitive element by a distinct polygon scanner to write each separate image field. Thus, each laser element emits a pulsating beam that writes a scan line across an image field on a photosensitive element in response to a video data stream during the passage of a polygon facet across the beam as the polygon rotates. Typically, two separate image fields are generated, one by each separate laser source in a system having two laser sources. The laser elements within the laser sources are driven by a PWM circuit operating on the video data streams formatted in a printer controller.

At block 810, the separate polygon scanners are synchronized to rotate in unison. Synchronization typically involves rotational position feedback to a phase lock circuit that functions to zero out differences in the relative positions of the polygon scanners. At block 812, a decision is made whether to generate additional image fields for the current printed page. Additional image fields would be required, for example, to print additional color layers in a multi-color print. If additional color layers are required in the printed image, the method continues at block 814 which instructs block 804 to independently randomize joint or splice locations for the next color layer with respect to previous color layers while formatting image data. The method then continues at block 804 as previously described. If no additional color layers are required, image exposure is complete and the method ends at block 816. Thus, joint or splice locations for each color layer in a multi-color image are separately and independently randomized and will not generally coincide with joint or splice locations in other color layers, further reducing the visibility of seams between image fields in multi-color images.

After image field data is converted into a plurality of video data streams according to the number of laser elements in each laser source, as shown at block 805, an alternative method continues at block 818. In the alternative method, each laser element in a first laser source is modulated with a corresponding video data stream causing it to emit a pulsating laser beam as indicated in block 818. At block 820, one or more pulsating laser beams emitted by the first laser source are scanned onto the photosensitive element by means of a particular facet of a single polygon scanner to write one or more scan lines in a first image field. At block 822, an N-facet delay time is introduced into each video data stream used to modulate a laser element in a second laser source. As previously defined with reference to FIG. 7, "N" is the number of polygon facet intervals separating a facet that reflects beams from the first laser source and a facet that reflects beams from the second laser source at any given time. In the embodiment illustrated in FIG. 2, for example, N is equal to 2 and the N-facet time delay would equal 2/6 times the rotational period of the scanner. Note that this scanner has 6 facets, making each facet interval 1/6 of the rotational period. At block 824, each laser element in the second laser source is modulated by a corresponding time-delayed video data stream, causing it to emit a pulsating laser beam. At block 826, one or more pulsating laser beams emitted by the second laser source are scanned onto the photosensitive element my means of the same facet of the same single polygon scanner to write the same one or more scan lines in a second image field. Use of the same facet to scan both image fields reduces the visibility of the splice between the two image fields because of the substantially identical effect that a tilt in the facet will have on both image fields. The alternative method continues at block 812 as previously described.

Figure 9:
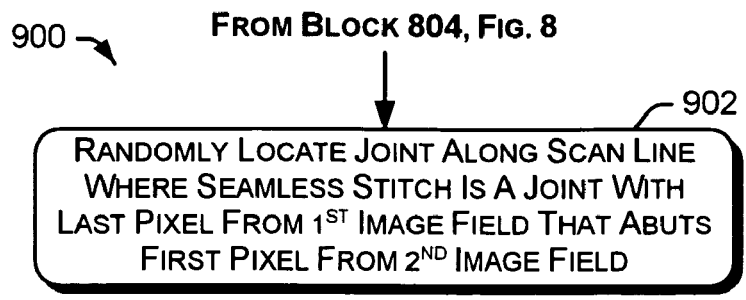

Several image stitching methods continue from block 804 of method 800. Method 900 of FIG. 9 is a continuation of the method 800 from block 804. At block 902 of method 900, a seamless stitch in the form of a joint between two image fields is randomly located along a scan line within an overlap region of the two image fields. The joint is formed where the last pixel from a first image field abuts the first pixel from a second image field. Randomly locating such joints within the overlap region of the two image fields for successive scan lines, breaks up the linearity of the seam between the two image fields and makes the seam less noticeable to the human visual system.

Figure 10:
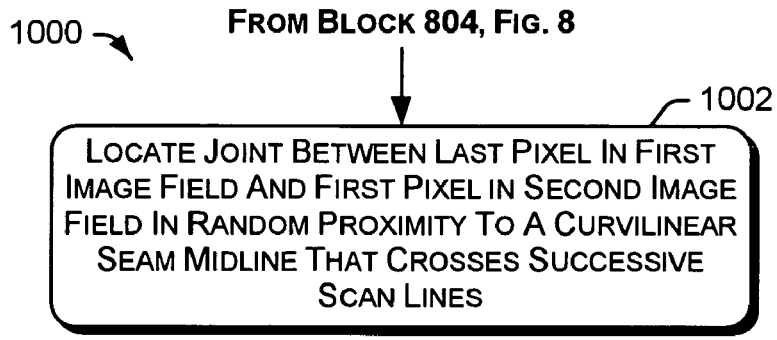

Method 1000 of FIG. 10 is another image stitching method that may continue from method 800 at block 804. At block 1002 of method 1000 two image fields written to photosensitive element 206 are joined along a curvilinear seam midline that crosses successive scan lines within an overlap region. A joint along a scan line between a last pixel in a first image field and a first pixel in a second image field is randomly located in proximity to the curvilinear seam midline. There is a random distribution of distances between the curvilinear seam midline and individual joint locations, causing most joints to lie near the seam midline rather than on it. The curvilinear shape of the midline of the seam between the two image fields breaks up the linearity of the seam and reduces its visibility. Randomly distributing the individual scan line joint locations with respect to the curvilinear seam midline further reduces the visibility of the seam.

Figure 11:
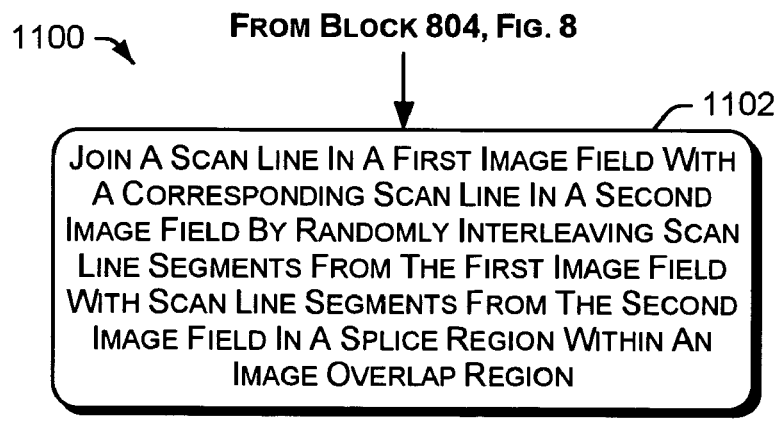

Method 1100 of FIG. 11 is another image stitching method that may continue from method 800 at block 804. At block 1102 of method 1100 a scan line in a first image field is joined with a corresponding scan line in a second image field by randomly interleaving scan line segments from the first image field with segments from the second image field in a splice region within the overlap region. Thus, a splice is made between corresponding scan lines in two image fields by alternating scan line segments taken from one image field with segments taken from the other. The alternating scan line segments may be of variable length and position within the splice region and the splice region may be randomly located within the overlap region. Thus, the alternating or "interleaved" segments may be randomly located with respect to other scan lines in the same color layer and with respect to the corresponding scan line in the other color layers.

Figure 12:
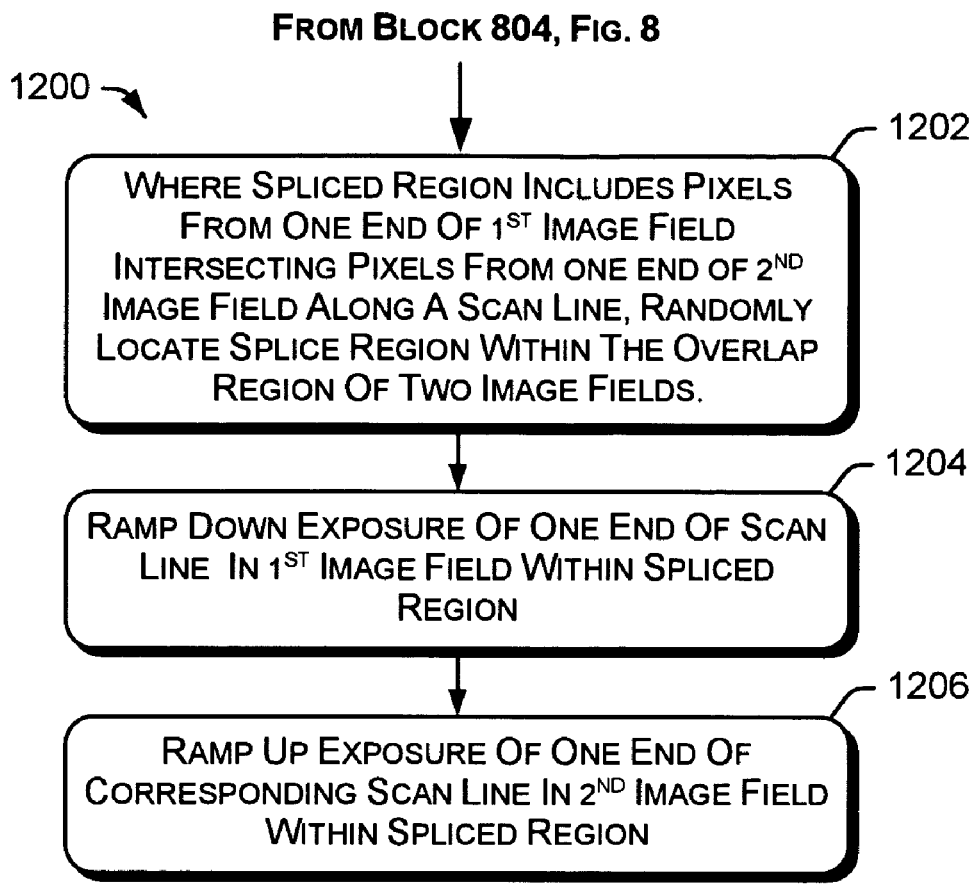

Method 1200 of FIG. 12 is another image stitching method that may continue from method 800 at block 804. At block 1202 of method 1200, a spliced region that includes pixels from one end of a first image field intersecting pixels from one end of a second image field is randomly located within the overlap region of the two image fields. At block 1204, the exposure of one end of a scan line in the first image field is ramped down within the spliced region from the point the scan line enters the splice region to the opposite end of the splice region. In addition, as shown at block 1206, the exposure of one end of the corresponding scan line in the second image field is ramped up within the spliced region from the point the scan line enters the splice region to the opposite end where the scan line leaves the splice region. The ramping of the exposures can be done linearly, providing the same total exposure to each pixel that it would have received from a single un-ramped scan, or the ramping can be nonlinear to compensate for inherent nonlinearities in the response of the photosensitive element and the remainder of the printing process. Nonlinear ramping may give better results for certain printing processes in the presence of pixel placement errors. Ramping exposures within the splice regions spatially distributes pixel placement errors thereby reducing their visibility between image fields and making the intersection between the images fields less noticeable. Randomizing the location of the splice region within the overlap region between successive scan lines breaks up the linearity of the seam between image fields, thereby making the seam less noticeable to the human visual system.

Methods 900, 1000, 1100 and 1200 have the common property that splice locations within the same color layer are randomized from one scan line to another scan line in the cross-scan direction. In addition, splice locations for the same scan line in different color layers of a multi-color image are independently randomized with respect to each other.

As previously discussed, many randomization algorithms are possible for randomizing the location of splices or spliced regions within the overlap region between image fields. Different randomization algorithms will generally have different statistical properties and will cause different visual perceptions of a splice between image fields. References in this disclosure to randomly locating splices or spliced regions are not intended to specify a particular randomization algorithm.

Methods 900, 1000, 1100, and 1200 may be used in a variety of combinations to achieve the desired suppression of artifacts associated with the stitching of image fields. A printer may be capable of using multiple stitching methods alone or in combination, and the stitching methods used may be dynamically determined during printing according to the nature of the printing task.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

Additionally, while one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

The invention claimed is:

1. A processor-readable medium comprising processor-executable instructions configured for:
   receiving image data; and
   formatting the image data into a plurality of separate image fields such that when scanned onto a photosensitive element, the separate image fields form a composite image having a seamless stitch joining the separate image fields; and
   scanning the plurality of separate image fields onto the photosensitive element from a single polygon scanner, wherein the scanning comprises:
      scanning a first laser beam across a first image field onto the photosensitive element from a particular facet of the single polygon scanner;
      introducing an n-facet delay time; and
      scanning a second laser beam across a second image field onto the photosensitive element from the particular facet of the single polygon scanner after the n-facet delay time.

2. A processor-readable medium as recited in claim 1, comprising further processor-executable instructions configured for converting the separate image fields into a plurality of video data streams according to a number of laser elements in one or more laser sources.

3. A processor-readable medium as recited in claim 2, comprising further processor-executable instructions configured for modulating each laser element with a corresponding video data stream.

4. A processor-readable medium as recited in claim 1, wherein an overlap region is defined by the first and second image fields.

5. A processor-readable medium as recited in claim 1, wherein the seamless stitch is a joint in a scan line where the first image field abuts the second image field, the joint comprising a last pixel from the first image field and a first pixel from the second image field, the formatting further comprising randomly locating the joint along the scan line.

6. A processor-readable medium as recited in claim 1, wherein the seamless stitch is a joint in a scan line where the first image field abuts the second image field, the joint comprising a last pixel from the first image field and a first pixel from the second image field, the formatting further comprising randomly locating the joint along the scan line in proximity to a curvilinear seam midline.

7. A processor-readable medium as recited in claim 1, wherein the seamless stitch is a spliced region in a scan line where pixels from one end of the first image field intersect pixels from one end of the second image field, the formatting further comprising randomly locating the spliced region along the scan line.

8. A processor-readable medium as recited in claim 7, comprising further processor-executable instructions configured for:
   ramping down exposure of the first image field within the spliced region; and
   ramping up exposure of the second image field within the spliced region.

9. A processor-readable medium as recited in claim 8, wherein the ramping down exposure further comprises decreasing exposure of the first image field from one hundred percent to zero percent as the first image field enters a first side of the spliced region and proceeds to a second side of the spliced region.

10. A processor-readable medium as recited in claim 8, wherein the ramping up exposure further comprises increasing exposure of the second image field from zero percent to one hundred percent as the second image field begins on a first side of the spliced region and proceeds to a second side of the spliced region.

11. A processor-readable medium as recited in claim 7, wherein a plurality of scan line segments containing pixels from the first image field alternate with a plurality of scan line segments containing pixels from the second image field within the spliced region.

12. A processor-readable medium as recited in claim 1, wherein the seamless stitch is a plurality of spliced regions in a scan line and each spliced region joins a particular color layer from the first image field with a same color layer from the second image field, the formatting further comprising:
   randomly locating each spliced region in the scan line such that corresponding color layers between the first image field and the second image field are joined at randomly located spliced regions.

13. A processor-readable medium comprising processor-executable instructions configured for:
   receiving image data representing an image;
   formatting the image data into a first and second video data stream; and
   forming the image on a photosensitive element in successive scan lines of video data, wherein each scan line comprises a first image field formed from the first video data stream adjacent to a second image field formed from the second video data stream, the first and second image fields joined by a seamless stitch, wherein the forming comprises:
      scanning the first laser beam across a first image field onto the photosensitive element from a particular facet of a single polygon scanner;
      introducing an n-facet delay time; and
      scanning the second laser beam across a second image field onto the photosensitive element from the particular facet of the single polygon scanner after the n-facet delay time.

14. A processor-readable medium as recited in claim 13, wherein the seamless stitch is a joint in a scan line where the first image field abuts the second image field, the joint comprising a last pixel from the first image field and a first pixel from the second image field, the formatting further comprising randomly locating the joint along the scan line.

15. A processor-readable medium as recited in claim 14, wherein joints are randomly located along scan lines within an overlap region on the photosensitive element.

16. A processor-readable medium as recited in claim 13, wherein the seamless stitch is a spliced region in a scan line where pixels from one end of a first image field intersect pixels from one end of a second image field, the formatting further comprising randomly locating the spliced region along the scan line.

17. A processor-readable medium as recited in claim 16, wherein spliced regions are randomly located along scan lines within an overlap region on the photosensitive element.

18. A processor-readable medium as recited in claim 16, comprising further processor-executable instructions configured for:
　　ramping down exposure of the first image field within the spliced region; and
　　ramping up exposure of the second image field within the spliced region.

19. A processor-readable medium as recited in claim 18, wherein the ramping down exposure further comprises decreasing exposure of the first image field from one hundred percent to zero percent as the first image field enters a first side of the spliced region and proceeds to a second side of the spliced region.

20. A processor-readable medium as recited in claim 18, wherein the ramping up exposure further comprises increasing exposure of the second image field from zero percent to one hundred percent as the second image field begins on a first side of the spliced region and proceeds to a second side of the spliced region.

21. A processor-readable medium comprising processor-executable instructions configured for:
　　receiving image data representing an image;
　　formatting the image data into a first and second video data stream, each video data stream representing a color layer; and
　　forming the image on a photosensitive element in successive scan lines of video data, wherein each scan line represents a different color layer from a first image field formed by the first video data stream joined by a seamless stitch to a corresponding color layer from a second image field formed by the second video data stream, wherein the forming comprises:
　　　　scanning a first laser beam across a first image field onto the photosensitive element from a particular facet of a single polygon scanner;
　　　　introducing an n-facet delay time; and
　　　　scanning a second laser beam across a second image field onto the photosensitive element from the particular facet of the single polygon scanner after the n-facet delay time.

22. A method for stitching an image in a printer comprising:
　　receiving image data; and
　　formatting the image data into a plurality of separate image fields such that when scanned onto a photosensitive element, the separate image fields form a composite image having a seamless stitch joining the separate image fields, and
　　scanning the plurality of separate image fields onto the photosensitive element from a single polygon scanner, wherein the scanning comprises:
　　　　scanning a first laser beam across a first image field onto the photosensitive element from a particular facet of a single polygon scanner;
　　　　introducing an n-facet delay time; and
　　　　scanning a second laser beam across a second image field onto the photosensitive element from the particular facet of the single polygon scanner after the n-facet delay time.

23. A method as recited in claim 22, further comprising converting the separate image fields into a plurality of video data streams according to a number of laser elements in one or more laser sources.

24. A method as recited in claim 22, wherein an overlap region is defined by the first and second image fields.

25. A method as recited in claim 22, wherein the seamless stitch is a joint in a scan line where the first image field abuts the second image field, the joint comprising a last pixel from the first image field and a first pixel from the second image field, the formatting further comprising randomly locating the joint along the scan line.

26. A method as recited in claim 22, wherein the seamless stitch is a joint in a scan line where the first image field abuts the second image field, the joint comprising a last pixel from the first image field and a first pixel from the second image field, the formatting further comprising randomly locating the joint along the scan line in proximity to a curvilinear seam midline.

27. A method as recited in claim 22, wherein the seamless stitch is a spliced region in a scan line where pixels from one end of the first image field intersect pixels from one end of the second image field, the formatting further comprising randomly locating the spliced region along the scan line.

28. A method as recited in claim 27, wherein a plurality of scan line segments containing pixels from the first image field alternate with a plurality of scan line segments containing pixels from the second image field within the spliced region.

29. A method as recited in claim 27, further comprising:
　　ramping down exposure of the first image field within the spliced region; and
　　ramping up exposure of the second image field within the spliced region.

30. A method as recited in claim 22, wherein the ramping down exposure further comprises decreasing exposure of the first image field from one hundred percent to zero percent as the first image field enters a first side of the spliced region and proceeds to a second side of the spliced region.

31. A method as recited in claim 22, wherein the ramping up exposure further comprises increasing exposure of the second image field from zero percent to one hundred percent as the second image field begins on a first side of the spliced region and proceeds to a second side of the spliced region.

32. A method as recited in claim 22, wherein the seamless stitch is a plurality of spliced regions in a scan line and each spliced region joins a particular color layer from the first image field with the same color layer from the second image field, the formatting further comprising:
　　randomly locating each spliced region in the scan line such that each corresponding color layer from the first image field and second image field is joined by a spliced region that is randomly located with respect to other spliced regions joining other corresponding color layers.

33. A method for stitching an image in a printer comprising:
- receiving image data representing an image;
- formatting the image data into a first and second video data stream; and
- forming the image on a photosensitive element in successive scan lines of video data, wherein each scan line comprises a first image field formed from the first video data stream adjacent to a second image field formed from the second video data stream, the first and second image fields joined by a seamless stitch, wherein the forming comprises:
  - scanning a first laser beam across the first image field onto the photosensitive element from a particular facet of the single polygon scanners;
  - introducing an n-facet delay time; and
  - scanning a second laser beam across the second image field onto the photosensitive element from the particular facet of the single polygon scanner after the n-facet delay time.

34. A method as recited in claim 33, wherein the seamless stitch is a joint in a scan line where the first image field abuts the second image field, the joint comprising a last pixel from the first image field and a first pixel from the second image field, the formatting further comprising randomly locating the joint along the scan line.

35. A method as recited in claim 34, wherein joints are randomly located along scan lines within an overlap region on the photosensitive element.

36. A method as recited in claim 33, wherein the seamless stitch is a joint in a scan line where the first image field abuts the second image field, the joint comprising a last pixel from the first image field and a first pixel from the second image field, the formatting further comprising randomly locating the joint along the scan line in proximity to a curvilinear seam midline.

37. A method as recited in claim 33, wherein the seamless stitch is a spliced region in a scan line where pixels from one end of the first image field intersect pixels from one end of the second image field, the formatting further comprising randomly locating the spliced region along the scan line.

38. A method as recited in claim 37, wherein spliced regions are randomly located along scan lines within an overlap region on the photosensitive element.

39. A method as recited in claim 37, further comprising:
- ramping down exposure of the first image field within the spliced region; and
- ramping up exposure of the second image field within the spliced region.

40. A method as recited in claim 39, wherein the ramping down exposure further comprises decreasing exposure of the first image field from one hundred percent to zero percent as the first image field enters a first side of the spliced region and proceeds to a second side of the spliced region.

41. A method as recited in claim 39, wherein the ramping up exposure further comprises increasing exposure of the second image field from zero percent to one hundred percent as the second image field begins on a first side of the spliced region and proceeds to a second side of the spliced region.

42. A method as recited in claim 37, wherein a plurality of scan line segments containing pixels from the first image field alternate with a plurality of scan line segments containing pixels from the second image field within the spliced region.

43. A method for stitching an image in a printer comprising:
- receiving image data representing an image;
- formatting the image data into a first and second video data stream, each video data stream representing a color layer; and
- forming the image on a photosensitive element in successive scan lines of video data, wherein each scan line represents a different color layer from a first image field formed by the first video data stream joined by a seamless stitch to a corresponding color layer from a second image field formed by the second video data stream, wherein the forming comprises:
  - scanning a first laser beam across the first image field onto the photosensitive element from a particular facet of the single polygon scanner;
  - introducing an n-facet delay time; and
  - scanning a second laser beam across the second image field onto the photosensitive element from the particular facet of the single polygon scanner after the n-facet delay time.

44. A printer comprising:
- a photosensitive element;
- a first laser source to emit a first laser beam;
- a second laser source to emit a second laser beam;
- a single polygon scanner to scan the first laser beam and the second laser beam, wherein the single polygonal element is configured for:
  - scanning the first laser beam across a first image field onto the photosensitive element from a particular facet of the single polygon scanner;
  - introducing an n-facet delay time; and
  - scanning the second laser beam across a second image field onto the photosensitive element from the particular facet of the single polygon scanner after the n-facet delay time;
- a first folding element to direct the first laser beam to the first image field on the photosensitive element; and
- a second folding element to direct the second laser beam to the second image field on the photosensitive element.

45. A printer as recited in claim 44, further comprising an overlap region on the photosensitive element wherein the first image field and the second image field are joined by a seamless stitch.

46. A printer as recited in claim 45, further comprising a joint locator to randomly locate the joint in the overlap region on the photosensitive element.

47. A printer as recited in claim 45, wherein the seamless stitch is a spliced region comprising a plurality of pixels from one end of the first image field overlapping a plurality of pixels from one end of the second image field.

48. A printer as recited in claim 47, further comprising a splice locator to randomly locate the spliced region in the overlap region on the photosensitive element.

49. A printer as recited in claim 47, further comprising a ramp controller to ramp down exposure of the first image field within the spliced region and ramp up exposure of the second image field within the spliced region.

50. A printer as recited in claim 44, wherein the seamless stitch is a joint comprising a last pixel from the first image field and a first pixel from the second image field.

* * * * *

UNITED STATES PATENT AND TRADEMARK OFFICE
CERTIFICATE OF CORRECTION

PATENT NO. : 7,271,822 B2  Page 1 of 1
APPLICATION NO. : 10/978014
DATED : September 18, 2007
INVENTOR(S) : David Kenney Towner It is certified that error appears in the above-identified patent and that said Letters Patent is hereby corrected as shown below:

In column 16, line 47, in Claim 30, delete "claim 22" and insert -- claim 29 --, therefor.

In column 16, line 52, in Claim 31, delete "claim 22" and insert -- claim 29 --, therefor.

In column 17, line 15, in Claim 33, delete "scanners" and insert -- scanner --, therefor.

Signed and Sealed this

Twelfth Day of August, 2008

JON W. DUDAS
*Director of the United States Patent and Trademark Office*